United States Patent
Hwang et al.

(10) Patent No.: US 12,037,491 B2
(45) Date of Patent: Jul. 16, 2024

(54) RESIN COMPOSITION, PREPREG INCLUDING THE SAME, LAMINATED PLATE INCLUDING THE SAME, RESIN-COATED METAL FOIL INCLUDING THE SAME

(71) Applicant: LG CHEM, LTD., Seoul (KR)

(72) Inventors: Yongseon Hwang, Daejeon (KR); Changbo Shim, Daejeon (KR); Hyunsung Min, Daejeon (KR); Hye Rim Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 997 days.

(21) Appl. No.: 16/975,374

(22) PCT Filed: Nov. 13, 2019

(86) PCT No.: PCT/KR2019/015458
§ 371 (c)(1),
(2) Date: Aug. 24, 2020

(87) PCT Pub. No.: WO2020/105949
PCT Pub. Date: May 28, 2020

(65) Prior Publication Data
US 2021/0032462 A1  Feb. 4, 2021

(30) Foreign Application Priority Data

Nov. 23, 2018 (KR) .................. 10-2018-0146306

(51) Int. Cl.
| | | |
|---|---|---|
| C08L 71/12 | (2006.01) |
| B32B 5/10 | (2006.01) |
| B32B 5/26 | (2006.01) |
| C08J 5/24 | (2006.01) |
| C08K 9/06 | (2006.01) |
| C08L 9/06 | (2006.01) |
| C08L 79/08 | (2006.01) |
| C08K 3/36 | (2006.01) |
| C08L 27/18 | (2006.01) |
| C08L 67/00 | (2006.01) |

(52) U.S. Cl.
CPC .............. *C08L 71/12* (2013.01); *B32B 5/10* (2013.01); *B32B 5/26* (2013.01); *C08J 5/244* (2021.05); *C08J 5/249* (2021.05); *C08K 9/06* (2013.01); *C08L 9/06* (2013.01); *C08L 79/08* (2013.01); *B32B 2305/076* (2013.01); *C08J 2309/06* (2013.01); *C08J 2367/00* (2013.01); *C08J 2371/12* (2013.01); *C08J 2479/08* (2013.01); *C08K 3/36* (2013.01); *C08L 27/18* (2013.01); *C08L 67/00* (2013.01)

(58) Field of Classification Search
CPC .......... B32B 27/20; B32B 15/08; B32B 15/20
See application file for complete search history.

(56) References Cited

U.S. PATENT DOCUMENTS

| | | | |
|---|---|---|---|
| 8,907,049 B2 | 12/2014 | Baidak et al. | |
| 2008/0261472 A1 | 10/2008 | Amou et al. | |
| 2010/0139961 A1* | 6/2010 | Kim ..................... | B32B 15/14 |
| | | | 428/458 |
| 2015/0027763 A1 | 1/2015 | Hong et al. | |
| 2015/0181707 A1 | 6/2015 | Kobayashi et al. | |
| 2018/0222152 A1 | 8/2018 | Umeda et al. | |
| 2019/0292364 A1 | 9/2019 | Kim et al. | |
| 2020/0045833 A1 | 2/2020 | Asahina et al. | |

FOREIGN PATENT DOCUMENTS

| | | |
|---|---|---|
| CN | 104379668 A | 2/2015 |
| CN | 108603003 A | 9/2018 |
| JP | 2001040182 A | 2/2001 |
| JP | 2008249851 A | 10/2008 |
| JP | 2010144153 A | 7/2010 |
| JP | 2012121814 A * | 6/2012 |
| JP | 5423602 B2 | 2/2014 |
| JP | 5482083 B2 | 4/2014 |
| JP | 2014521800 A | 8/2014 |
| JP | 2015024945 A | 2/2015 |
| JP | 2016166347 A | 9/2016 |
| JP | 2017066280 A | 4/2017 |
| KR | 100975161 B1 | 8/2010 |
| KR | 20150032663 A | 3/2015 |
| KR | 20160051705 A | 5/2016 |
| KR | 20180007306 A | 1/2018 |
| TW | 201740780 A | 11/2017 |
| WO | 2017017923 A1 | 2/2017 |
| WO | 2018012775 A1 | 1/2018 |

OTHER PUBLICATIONS

Google Translation of JP 2012121814 A (Year: 2024).*
J.D. Rusmirovic, et al., High performance unsaturated polyester based nanocomposites: Effect of vinyl modified nanosilica on mechanical properties, eXPRES Polymer Letters vol. 10, No. 2 (2016) 139-159.
Chen et al., Journal of Polymer Research, The Effects of Phenyltrimethoxysilane Coupling Agents on the Properties of PTFE/Silica Composites, 2004, vol. 11, pp. 1-7.

* cited by examiner

*Primary Examiner* — Michael M Dollinger
(74) *Attorney, Agent, or Firm* — BRYAN CAVE LEIGHTON PAISNER LLP

(57) ABSTRACT

The present invention relates to a resin composition including a binder resin and an organic-inorganic composite filler, a prepreg including the same, a laminated plate including the same, and a resin-coated metal foil including the same.

15 Claims, No Drawings

RESIN COMPOSITION, PREPREG INCLUDING THE SAME, LAMINATED PLATE INCLUDING THE SAME, RESIN-COATED METAL FOIL INCLUDING THE SAME

The present application is a National Phase entry pursuant to 35 U.S.C. § 371 of International Application No. PCT/KR2019/015458 filed on Nov. 13, 2019, and claims the benefit of and priority to Korean Patent Application No. 10-2018-0146306 filed with Korean Intellectual Property Office on Nov. 23, 2018, the entire disclosures of which are incorporated herein by reference.

FIELD

The present invention relates to a resin composition, a laminated plate including the same, and a resin-coated metal foil including the same.

BACKGROUND

Recently, the signal band of an electronic part such as a semiconductor substrate, a printed circuit board, and an epoxy molding compound (EMC) and an information and communication device tends to increase. The transmission loss of electrical signals is proportional to dielectric loss tangent and frequency. Accordingly, a higher frequency increases the transmission loss and brings about attenuation of signals, thereby leading to deterioration in the reliability of signal transmission. Further, the transmission loss is converted into heat, and thus, a problem of heat generation may also be caused. For that reason, there is a growing need for an insulation material having a very low dielectric loss tangent in a high frequency region.

In addition, as the demand for high integration, high refinement, high performance, and the like in the semiconductor device and PCB fields is currently increased, the condition is gradually changed into a situation in which the integration of semiconductor devices, the high density of printed circuit boards, and simultaneously the simplicity of wiring interval are required. In order to satisfy these characteristics, it is preferred to use a material having a low permittivity which allows a transmission rate to be increased and a low dielectric loss characteristic for reducing a transmission loss.

Conventionally, in order to develop such insulating materials, insulating materials based on a polyphenylene ether (PPE) resin, which is a thermosetting resin having excellent dielectric properties, have been developed, but they have a problem with a high melt viscosity, a difficulty in handleability, molding processability of a prepreg, and the like. In addition, a filler such as a porous filler, which is advantageous for low dielectric properties, was introduced into the polyphenylene ether resin, but the dispersibility of the filler was low, which caused problems in terms of processability and heat resistance, and there was a problem that it is difficult to apply the filler at a high content.

SUMMARY

An object of the present invention is to provide a resin composition which improves compatibility between a binder resin and a filler and thus exhibits excellent processability and heat resistance, and also simultaneously satisfies low coefficient of thermal expansion (CTE), low dielectric properties, and low dielectric loss.

Another object of the present invention is to provide a prepreg, a laminated plate, and a resin-coated metal foil using the above-mentioned resin composition.

In one aspect, there is provided a resin composition including a binder resin and an organic-inorganic composite filler, wherein the organic-inorganic composite filler comprises an organic filler having a coating layer, the coating layer including inorganic particles surface-treated with a silane coupling agent containing a functional group that has a double bond.

In another aspect, there is provided a prepreg including: a fibrous substrate; and the resin composition impregnated into the fibrous substrate.

In yet another aspect, there is provided a laminated plate in which the above-mentioned prepreg is laminated with at least two or more layers.

In still yet another aspect, there is provided a resin-coated metal foil including a metal foil, and a resin layer located on the metal foil, and in which the resin composition is cured.

Hereinafter, a resin composition, a prepreg including the same, a laminated plate including the same, and a resin-coated metal foil including the same according to specific embodiments of the present invention will be described in more detail.

DETAILED DESCRIPTION

In the present specification, a fluorine-based organic filler means an organic filler containing one or more fluorine elements among the organic fillers.

In addition, a silane containing a functional group containing a double bond means a silane containing a functional group containing one or more double bonds as a substituent of the silane.

Further, a (meth)acrylate group is meant to include both acrylate group and methacrylate group.

Further, a prepreg means a sheet-like material obtained by coating or impregnating a fibrous substrate with a resin composition, and then curing to the half-curing state (B-stage) by heating.

In one embodiment of the invention, there is provided a resin composition comprising a binder resin and an organic-inorganic composite filler, wherein the organic-inorganic composite filler comprises an organic filler in which a coating layer including inorganic particles surface-treated with a silane coupling agent containing a functional group that includes a double bond is formed.

The present inventors have conducted research on the resin composition used for a prepreg, a laminated plate, a resin-coated metal foil, and the like, and have found through experiments that the resin composition using the organic-inorganic composite filler having a core-shell structure composed of an organic filler (core) and a coating layer (shell) including inorganic particles surface-treated with a silane coupling agent containing a functional group that has a double bond exhibits low coefficient of thermal expansion (CTE), low dielectric properties, and low dielectric loss, and also simultaneously satisfies excellent heat resistance and processability.

The organic or inorganic fillers included in a conventional resin composition have a low dispersibility in the binder resin and thus lead to a problem in terms of processability, heat resistance and the like, whereby it is difficult to apply the filler at a high content.

However, since the organic-inorganic composite filler includes an inorganic particle surface-treated with a silane coupling agent containing a functional group having a double bond in the coating layer, it has excellent dispersibility and compatibility with the binder resin and, therefore, the composite filler not only prevents problems in terms of processability, heat resistance, and the like, but also improves effects such as heat resistance after moisture absorption while lowering dielectric properties.

The organic filler corresponding to the core of the organic-inorganic composite filler having a core-shell structure is not particularly limited as long as it is an organic filler known in the art, but it may be, for example, a fluorine-based organic filler containing a fluorine element. More specifically, the fluorine-based organic filler may be one or more selected from the group consisting of polytetrafluoroethylene powder, tetrafluoroethylene-perfluoroalkoxyethylene copolymer (PFA), ethylene-chlorotrifluoroethylene copolymer (PCTFE) and polyfluorovinylidene (PVDF).

The coating layer corresponding to the shell of the organic-inorganic composite filler having a core-shell structure includes inorganic particles surface-treated with a silane coupling agent containing a functional group that has a double bond.

The silane coupling agent containing the functional group that has a double bond serves to improve compatibility with the binder resin, and the organic-inorganic composite filler in which the inorganic particles surface-treated with a silane coupling agent containing a functional group having a double bond is located at the outermost part, and has excellent compatibility with the binder resin.

The silane coupling agent containing a functional group having a double bond means a silane coupling agent containing a functional group having one or more double bonds as a substituent of a silane coupling agent. The functional group containing a double bond in the silane coupling agent may be a vinyl group or a (meth)acrylate group.

The silane coupling agent containing a functional group having a double bond is not particularly limited as long as it is a silane coupling agent containing a functional group having a double bond known in the art, and it may be, for example, one or more selected from the group consisting of vinyl trimethoxysilane, vinyl triethoxysilane, p-styryl trimethoxysilane, 3-methacryloxypropyl trimethoxysilane, 3-methacryloxypropyl triethoxysilane and 3-acryloxypropyl trimethoxysilane.

Further, the inorganic particles are not particularly limited as long as they are inorganic particles known in the art and are those whose surface has been treated with a silane coupling agent containing a functional group having a double bond. Examples thereof include silicas such as natural silica, fused silica, amorphous silica, and crystalline silica; boehmite, alumina, talc, spherical glass, calcium carbonate, magnesium carbonate, magnesia, clay, calcium silicate, titanium oxide, antimony oxide, glass fiber, aluminum borate, barium titanate, strontium titanate, calcium titanate, magnesium titanate, bismuth titanate, titanium oxide, barium zirconate, calcium zirconate, boron nitride, silicon nitride, talc, mica, and the like. Their surfaces are treated with silane coupling agents containing a functional group that have a double bond. These inorganic fillers may be used either alone or in mixture of two or more thereof. Among them, fused silica showing a low coefficient of thermal expansion can be used. The method for treating the surface of the inorganic particles with a silane coupling agent containing a functional group having a double bond may be prepared by conventional methods known in the art. As one example, it may be prepared by adding the inorganic particles to a solution containing a silane coupling agent containing a functional group having a double bond, followed by drying.

The average particle size of the inorganic particles surface-treated with the silane coupling agent containing a functional group having a double bond is not particularly limited, but for example, an average particle diameter may be 200 nm or less, 50 to 200 nm, 50 to 100 nm, or 50 to 70 nm.

The method for preparing the organic-inorganic composite filler is not particularly limited, but it may be prepared by mixing the organic filler and the inorganic particles surface-treated with a silane coupling agent containing a functional group including a double bond, or by applying vibration after mixing. The method of coating the inorganic particles surface-treated with the silane coupling agent containing a functional group including a double bond on the surface of the organic filler may be carried out in a dry state.

Meanwhile, the mixing ratio of the organic filler and the inorganic particles surface-treated with the silane coupling agent containing a functional group having a double bond is not limited thereto. For example, in the organic-inorganic composite filler, the content of the inorganic particles surface-treated with a silane coupling agent containing a functional group having a double bond may be 0.001 to 10 parts by weight, 0.005 to 5 parts by weight, or 0.01 to 2 parts by weight based on 100 parts by weight of the organic filler.

The average particle size of the organic-inorganic composite filler is not particularly limited, but for example, the average particle sizer may be 0.3 to 5 μm, 0.4 to 4 μm, or 0.5 to 3 μm. If the average particle size is less than 0.3 μm, there be a problem that the cohesiveness becomes high. If the average particle size is greater than 5 μm, it may be difficult to apply at the time of producing a thin film due to high volume/volume ratio.

In the resin composition, the content of the organic-inorganic composite filler may be 20 to 90 parts by weight, 25 to 85 parts by weight, or 30 to 80 parts by weight, based on 100 parts by weight of the binder resin.

The resin composition according to one embodiment may further include an inorganic filler surface-treated with a silane coupling agent containing a functional group having a double bond.

In the resin composition, the content of the inorganic filler may be 80 parts by weight or less, 5 to 80 parts by weight, 10 to 70 parts by weight, 15 to 60 parts by weight, 20 to 50 parts by weight, or 25 to 40 parts by weight, based on 100 parts by weight of the binder resin. If the content of the inorganic filler is too high, there is a problem that the permittivity becomes high.

The inorganic filler is one whose surface has been treated with a silane coupling agent containing a functional group containing a double bond, and the inorganic filler can reduce the difference in the coefficient of thermal expansion (CTE) between the resin layer and the other layer, thereby effectively improving the bending properties, low expansion, mechanical strength (toughness), lower stress of the final product.

The inorganic particles are not particularly limited as long as they are inorganic particles known in the art and are those whose surface has been treated with a silane coupling agent containing a functional group having a double bond. Examples thereof include silicas such as natural silica, fused silica, amorphous silica, and crystalline silica; boehmite, alumina, talc, spherical glass, calcium carbonate, magnesium carbonate, magnesia, clay, calcium silicate, titanium oxide, antimony oxide, glass fiber, aluminum borate, barium titanate, strontium titanate, calcium titanate, magnesium titanate, bismuth titanate, titanium oxide, barium zirconate, calcium zirconate, boron nitride, silicon nitride, talc, mica, and the like. Their surfaces are treated with silane coupling agents containing a functional group that has a double bond. These inorganic fillers may be used either alone or in mixture of two or more thereof. Among them, fused silica showing a low coefficient of thermal expansion can be used.

The method for preparing the inorganic filler surface-treated with a silane coupling agent containing a functional group having a double bond is not particularly limited, and may be prepared by conventional methods known in the art. As one example, it may be prepared by adding the inorganic particles to a solution containing a silane coupling agent containing a functional group having a double bond, followed by drying.

The resin composition according to one embodiment may include the inorganic filler surface-treated with a silane coupling agent containing a functional group including a double bond, and the organic-inorganic composite filler together. Thereby, the compatibility between the filler and the binder resin is improved and thus, it is possible to improve the effects such as heat resistance after moisture absorption, processability and heat resistance, while lowering the dielectric properties. Further, it can reduce the difference in the coefficient of thermal expansion (CTE) between the resin layer and the other layer, thereby effectively improving the bending properties, low expansion, mechanical strength (toughness), lower stress of the final product.

The binder resin contained in the resin composition according to one embodiment may be used without limitation as long as it is a conventional binder resin known in the art, and for example, it may include one or more selected from the group consisting of polyphenylene ether resin, cyanate ester resin, bismaleimide resin, butadiene resin, phenoxy resin, polyamideimide resin, polyetherimide resin, polysulfone resin, polyethersulfone resin, polycarbonate resin and polyether ether ketone resin.

More specifically, the binder resin may include a polyphenylene ether resin (a), a bismaleimide resin (b), a cyanate ester resin (c) and/or a styrene-butadiene resin (d). Since these resins have better compatibility with the organic-inorganic composite filler, it is possible to further improve heat resistance after moisture absorption and processability while lowering dielectric properties.

The phenylene ether resin (a) may include a modified phenylene ether oligomer or a modified poly(phenylene ether) functionalized with an ethylenically unsaturated group at both ends. The two ethylenically unsaturated groups functionalized at both ends of the component (a) may be the same or different.

The ethylenically unsaturated group may be, for example, alkenyl groups such as ethenyl group, allyl group, methallyl group, propenyl group, butenyl group, hexenyl group, and octenyl group; cycloalkenyl groups such as cyclopentenyl group and cyclohexenyl group; acryl group, methacryl group; or alkenylaryl group such as vinylbenzyl group and vinylnaphthyl group.

The method for preparing the component (a) is not particularly limited, but for example, those functionalized with a vinylbenzyl group can be prepared by dissolving the bifunctional phenylene ether oligomer and a vinylbenzene chloride in a solvent, adding a base thereto under heating and stirring for reaction, and then solidifying a resin.

The number average molecular weight of the component (a) in terms of polystyrene by the GPC method may be in the range of 500 to 3000 g/mol, or 1000 to 2500 g/mol. When the number average molecular weight of the component (a) is less than 500 g/mol, there is a problem that the prepreg formed using the resin composition adheres well. When it exceeds 3000 g/mol, solubility in a solvent may be reduced.

As the bismaleimide resin (b) and the cyanate ester resin (c), those well known in the technical field to which the present invention pertains may be used without particular limitation.

For example, the bismaleimide resin (b) may be one or more compounds selected from the group consisting of diphenylmethane bismaleimide such as 4,4'-diphenylmethane bismaleimide, oligomer of phenylmethane maleimide, phenylene bismaleimide such as m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, and 1,6-bismaleimide-(2,2,4-trimethyl)hexane.

Further, for example, the cyanate ester resin (c) may be one or more compounds selected from the group consisting of novolac type cyanate resin, dicyclopentadiene type cyanate resin, bisphenol type cyanate resin, and partially triazinated prepolymer thereof.

The styrene-butadiene resin (d) is a copolymer resin of styrene and butadiene, is a liquid at room temperature, and may have a styrene content of about 5 to 50%. Further, the styrene-butadiene resin (d) may have a glass transition temperature (Tg) of −35° C. to 0° C. or −30° C. to −5° C.; and a number average molecular weight of 1000 to 50000 g/mol or 2000 to 10000 g/mol.

The resin composition according to one embodiment may further include one or more additives selected from the group consisting of a curing agent, a flame retardant, a UV shielding agent, a leveling agent, a thickener, a pigment, a dispersant, and an antioxidant.

As the curing agent, conventional curing agents known in the art can be used without limitation, and for example, it may be one or more curing agents selected from amide-based curing agent, polyamine-based curing agent, acid anhydride curing agent, phenol novolac type curing agent, polymercaptan curing agent, tertiary amine curing agent, imidazole curing agent, and metal coordination catalyst. Specifically, the metal coordination catalyst may be cobalt (II) acetate, which may promote triazine bonding of cyanate esters that may be included in the binder resin.

The content of the curing agent in the resin composition may be 0.1 to 10% by weight, 0.2 to 8% by weight, or 0.5 to 5% by weight, based on the total weight of the resin composition.

As the flame retardant, conventional flame retardants known in the art may be used without limitation, and examples thereof may be halogen flame retardants containing bromine or chlorine; phosphorous-based flame retardants such as triphenyl phosphate, tricrecylphosphate, tris-dichloropropyl phosphate, and phosphazene; antimony-based flame retardants such as antimony trioxide; flame retardants of inorganic substances such as aluminum hydroxide and magnesium hydroxide and the like.

The content of the flame retardant in the resin composition may be 0.1 to 10% by weight, 0.2 to 8% by weight, or 0.5 to 5% by weight, based on the total weight of the resin composition. If the content of the flame retardant is less than 0.1% by weight, it cannot have flame resistance, and if it exceeds 10% by weight, electrical characteristics may be deteriorated.

In another embodiment of the invention, there is provided a prepreg including: a fibrous substrate; and the resin composition impregnated into the fibrous substrate.

The fibrous substrate is not particularly limited, but examples thereof may include one or more selected from the group consisting of glass fiber, glass paper, glass fiber nonwoven fabric (glass web), glass cloth, aramid fiber, aramid paper, polyester fiber, carbon fiber, inorganic fiber, and organic fiber.

The fibrous substrate may be surface-treated with a silane coupling agent containing a functional group including a double bond.

When impregnating the resin composition into the fibrous substrate surface-treated with a silane coupling agent containing a functional group having the double bond, since both the fibrous substrate, and the inorganic filler and organic-inorganic composite filler contained in the resin composition contain a functional group having a double bond, compatibility between them is excellent, whereby dielectric properties are improved, heat resistance after moisture absorption and processability are further improved, and thus a material for high frequency can be developed.

The method of treating the surface of the fibrous substrate with a silane coupling agent containing a functional group having a double bond may be prepared by conventional methods known in the art. The method of treating the surface of the fibrous substrate with a silane coupling agent containing a functional group having a double bond can be produced by a usual method known in the art. As one example, it may be prepared by adding a fibrous substrate to a solution containing a silane coupling agent containing a functional group having a double bond, followed by drying.

The thickness of the fibrous substrate is not particularly limited, and may be, for example, in the range of 0.01 to 0.3 mm.

The method for producing the prepreg is not particularly limited, and may be prepared according to a production method known in the art.

The prepreg refers to a sheet-like material obtained by coating or impregnating a resin composition onto a fibrous substrate surface-treated with a silane coupling agent containing a functional group having a double bond, and then curing to the half-curing state (B-stage) by heating. At this time, the heating temperature and time is not particularly limited, and for example, the heating temperature may be about 20 to 200° C. or 70 to 170° C., and the heating time may be in the range of about 1 to 10 minutes.

In addition to the above-mentioned method, the prepreg can be produced by a known hot-melt method, a solvent method or the like known in the art. The solvent method is a method of impregnating a resin substrate into a varnish, which is formed by dissolving the resin composition for prepreg formation in an organic solvent, and then drying them. When such a solvent method is employed, a varnish is generally used. Examples of the method of impregnating the resin composition into a fiber substrate may include a method of immersing the fibrous substrate in a varnish, a method of applying varnish to a substrate by various coaters, a method of spraying varnish onto substrate by spraying and the like. At this time, when the fiber substrate is immersed in the resin varnish, the impregnability of the resin composition to the fibrous substrate can be improved and thus it is preferable.

When the varnish is prepared, examples of the organic solvent may include ketones such as acetone, methylethylketone and cyclohexanone; acetic acid esters such as ethyl acetate, butyl acetate, cellosolve acetate, propylene glycol monomethylether acetate and carbitol acetate; cellosolve, carbitols such as butyl carbitol; aromatic hydrocarbons such as toluene and xylene; dimethyl formamide, dimethyl acetamide, N-methyl pyrrolidone, tetrahydrofuran and the like. As the organic solvent, one type of organic solvent may be used alone, or two or more types of organic solvents may be used in combination.

In addition, the hot melt method may be a method in which the resin composition is coated on a release paper having excellent releasability from the resin composition without dissolving the resin composition in an organic solvent, and then laminated on a sheet-like fiber substrate, or directly coated by a die coater. Also, it may be produced by continuously thermal-laminating an adhesive film comprising a thermosetting resin composition laminated on a support from both sides of the sheet-like reinforcing substrate under heating and pressing conditions.

In yet another embodiment, there is provided a laminated plate in which the above-mentioned prepreg of the above-mentioned one embodiment is laminated by at least two or more layers.

For example, the laminated plate may be produced by laminating one or a plurality of the prepregs of the above-mentioned embodiment, optionally, overlapping a metal foil on one side or both sides thereof, and then heating and pressing the resulting product.

The heating and pressing conditions during the production of the laminated plate are not particularly limited, but it is possible to apply a pressure of 70 to 800 psi in the temperature range of 140 to 220° C. Within this range, it may be advantageous for interlayer adhesion, heat resistance, reliability, and the like of the laminated plate.

In addition, as a device for heating and pressing during the production of the laminated plate, a multi-stage press, a multi-stage vacuum press, a continuous molding, an autoclave molding machine and the like may be used, but the laminated plate of the above-mentioned embodiment is not limited thereto.

When a metal foil is used during the production of the laminated plate, although not particularly limited, the metal foils made of one or more metals of copper, aluminum, nickel, nickel phosphorus, nickel tin alloy, nickel iron alloy, lead, and lead tin alloy may be used as one sheet or plural sheets.

In another embodiment of the invention, there is provided a resin-coated metal foil including: a metal foil; and a resin layer which is located on the metal foil and in which the resin composition of the above-mentioned embodiment is cured.

For example, the resin-coated metal foil can be produced by preparing a resin composition that has not been processed into a prepreg as a varnish, coating it to a metal foil, followed by drying.

The varnish for the production of the metal foil with resin includes a solvent, similarly to the varnish composition for the preparation of the prepreg, but may further include a curing agent, a curing catalyst and the like.

As the metal foil, those made of conventional metals or alloys known in the art can be used without limitation. In this case, the metal foil may be a copper foil, and examples of the copper foil that can be used include CFL (TZA_B, HFZ_B), Mitsui (HSVSP, MLS-G), Nikko (RTCHP), Furukawa, ILSIN, and the like.

The copper foil includes all the copper foils produced by a rolling method and an electrolytic method. Here, the copper foil may be subjected to rust-prevention treatment in order to prevent the surface thereof from being oxidized and corroded.

In the metal foil, a predetermined surface roughness (Rz) may also be formed on one surface where the resin composition is brought into contact with a cured resin layer. In this case, the surface roughness (Rz) is not particularly limited, but may be, for example, in a range of 0.6 to 3.0 μm.

Furthermore, the thickness of the metal foil is not particularly limited, but may be less than 5 μm or 1 to 3 μm in consideration of the thickness and mechanical properties of a final product.

Since the resin composition according to the present invention satisfies low coefficient of thermal expansion (CTE), low dielectric properties, low dielectric loss, high heat resistance and excellent processability at the same time, the prepreg, laminated plate, resin-coated metal foil, etc. using the same can be easily provided for use in components such as an automobile, a large-sized computer and a server.

Hereinafter, the present invention will be described in more detail with reference to examples. However, these examples are for illustrative purposes only, and the scope of the present invention is not limited by these examples.

Examples

Examples 1 to 4 and Comparative Examples 1 to 4

The binder resin, the inorganic filler, and the organic-inorganic composite filler were mixed according to the composition shown in Table 1 below, and stirred for 4 hours to prepare the resin compositions of Examples and Comparative Examples.

Evaluation

The physical properties of Examples and Comparative Examples were evaluated by the following method, and the evaluation results are shown in Table 2 below.

(1) Production of Prepreg and Laminate for Evaluation

The resin compositions of Examples and Comparative Examples were impregnated into glass fibers (thickness of 15 μm, Asahi Kasei, 1017, L-glass) surface-treated with vinylsilane, and then dried at a temperature of 130 to 160° C. for about 3 to 10 minutes to prepare a prepreg having a thickness of 30 μm.

Subsequently, the two prepregs were laminated, and then copper foil (thickness of 12 μm, manufactured by Mitsui) was pressed on both sides to prepare a copper-clad laminated plate.

(2) Resin Flow

The resin flow (%) was measured and evaluated in accordance with IPC-TM-650 2.3.17 Test Methods Manual using a cover press in a prepreg state (Based on drying at 170° C. for 3 minutes).

(3) Heat Resistance (Solder Floating)

The heat resistance was evaluated by floating the laminated plate on a solder at 288° C. in accordance with IPC-TM-650 2.4.13 Test Methods Manual to measure the time point when a separation phenomenon occurred between the insulating layer and the copper foil and between the insulating layer and the metal core or the insulating layer.

(4) Measurement of Relative Permittivity and Dielectric Loss Tangent

The relative permittivity and the dielectric loss tangent were measured at a frequency of 1 GHz using a relative permittivity measuring device (RF Impedance, Agilent) using a laminated plate from which a copper foil was removed.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Binder resin (part by weight) | Polyphenylene ether |  |  |  |  | 21 |  |  |  |
|  | Bismaleimide-based resin |  |  |  |  | 17 |  |  |  |
|  | Cyanate ester resin |  |  |  |  | 52 |  |  |  |
|  | Styrene-butadiene rubber |  |  |  |  | 10 |  |  |  |
| Inorganic filler (phr) |  | 30 | 30 | 75 | 75 | 30 | 75 | — | — |
| Organic-inorganic composite filler (phr) |  | 30 | 75 | 30 | 75 | — | — | 30 | 75 |

Polyphenylene ether: OPE-2st-1200, available from by MGC (Mitsubishi Gas Chemical Company, Inc.)
Bismaleimide resin: BMI-5100 available from DAIWA Kasei
Cyanate ester resin: ULL-950S available from Lonza Ltd.
Styrene-butadiene rubber: Ricon181 available from Cray Valley
Inorganic filler: filler (silica) of slurry type (solid content of 70%) surface-treated with vinylsilane (vinyltrimethoxysilane), average particle size of 0.5 μm, SC2050, available from Admatechs
Organic-inorganic composite filler: polytetrafluoroethylene** coated with silica*, average particle size of 3 μm, specific surface area of 1.5 $m^2/g$, available from Admatechs.
*Silica: Silica surface-treated with vinylsilane (vinyltrimethoxysilane), average particle size of 150 nm, available from Admatechs
**Polytetrafluoroethylene, average particle size of 3 μm, TFW-3000FK, available from Seishin Corporation phr: It is an abbreviation of 'parts per hundred resin' and is a unit of usage of the inorganic filler and the organic-inorganic composite filler. Specifically, it is the content (parts by weight) of each of the inorganic filler and the organic-inorganic composite filler with respect to 100 parts by weight of the binder resin.

(5) Coefficient of Thermal Expansion (CTE)

The coefficient of thermal expansion was measured using the laminated board from which copper foil was removed. Specifically, the coefficient of thermal expansion (ppm/° C.) was measured and evaluated by TMA Q400 (TA Instruments) in accordance with IPC-TM-650.2.4.24 Test Methods Manual.

TABLE 2

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Resin flow (%) | 18 | 14 | 12 | 10 | 20 | 15 | 22 | 19 |
| Heat resistance (@288° C., min) | >5 | >5 | >5 | >5 | >5 | >5 | 2 | 1 |
| Permittivity (Dk @ 1 GHz) | 3.08 | 3.02 | 3.20 | 3.14 | 3.11 | 3.25 | 2.96 | 2.9 |
| Dielectric loss (Df @ 1 GHz) | 0.003 | 0.003 | 0.003 | 0.003 | 0.004 | 0.003 | 0.005 | 0.005 |
| Coefficient of thermal expansion (ppm/° C.) | 19.3 | 18.5 | 17.9 | 17.1 | 20.1 | 18.4 | 22 | 21.1 |

According to Table 2, it was confirmed that since Examples 1 to 4 apply the inorganic filler and the organic-inorganic composite filler together, they are excellent in reliability as insulating materials due to their excellent heat resistance and low coefficient of thermal expansion, and exhibit low permittivity.

On the other hand, it was confirmed that Comparative Example 1 using 30 phr content of the inorganic particles alone has a higher dielectric loss and a higher coefficient of thermal expansion compared to Examples 1 and 2 containing the same amount of inorganic particles, and that Comparative Example 2 using 70 phr content of inorganic particles has higher permittivity compared to Examples 3 and 4 including the same amount of inorganic particles. In addition, it was confirmed that Comparative Examples 3 and 4, in which only organic-inorganic composite fillers are applied, have lower heat resistance and higher coefficient of thermal expansion compared to Examples.

What is claimed is:

1. A prepreg comprising:
a fibrous substrate; and
a resin composition impregnated into the fibrous substrate,
wherein the resin composition comprises:
a binder resin;
25 to 85 parts by weight of an organic-inorganic composite filler, based on 100 parts by weight of the binder resin, wherein the organic-inorganic composite filler comprises an organic filler having a coating layer, the coating layer including inorganic particles surface-treated with a silane coupling agent containing a functional group that has a double bond; and
25 to 80 parts by weight of an inorganic filler surface-treated with a silane coupling agent containing a functional group containing a double bond, based on 100 parts by weight of the binder resin.

2. The prepreg of claim 1, wherein
the binder resin comprises one or more selected from the group consisting of polyphenylene ether resin, cyanate ester resin, bismaleimide resin, butadiene resin, phenoxy resin, polyamideimide resin, polyetherimide resin, polysulfone resin, polyethersulfone resin, polycarbonate resin and polyether ether ketone resin.

3. The prepreg of claim 1, wherein
the organic filler is a fluorine-based organic filler containing a fluorine element.

4. The prepreg of claim 1, wherein
in the organic-inorganic composite filler, a content of the inorganic particles surface-treated with a silane coupling agent containing a functional group having a double bond is 0.001 to 10 parts by weight, based on 100 parts by weight of the organic filler.

5. The prepreg of claim 1, wherein
the functional group containing a double bond is a vinyl group or a (meth)acrylate group.

6. The prepreg of claim 1, wherein
the resin composition further comprises one or more selected from the group consisting of a curing agent, a flame retardant, a UV shielding agent, a leveling agent, a thickener, a pigment, a dispersant, and an antioxidant.

7. The prepreg of claim 1, wherein
the fibrous substrate is surface-treated with a silane coupling agent containing a functional group having a double bond.

8. A laminated plate in which at least two or more layers of the prepreg of claim 1 is laminated with at least two or more layers.

9. The laminated plate of claim 8, wherein
the laminated plate is heated and pressed in a state where the prepreg is laminated with at least two layers or more.

10. A resin-coated metal foil comprising:
a metal foil; and
a resin layer which is located on the metal foil and in which a resin composition is cured wherein the resin composition comprises:
a binder resin;
25 to 85 parts by weight of an organic-inorganic composite filler, based on 100 parts by weight of the binder resin, wherein the organic-inorganic composite filler comprises an organic filler having a coating layer, the coating layer including inorganic particles surface-treated with a silane coupling agent containing a functional group that has a double bond; and 25 to 80 parts by weight of an inorganic filler surface-treated with a silane coupling agent containing a functional group containing a double bond, based on 100 parts by weight of the binder resin.

11. The resin-coated metal foil of claim 10, wherein the binder resin comprises one or more selected from the group consisting of polyphenylene ether resin, cyanate ester resin, bismaleimide resin, butadiene resin, phenoxy resin, polyamideimide resin, polyetherimide resin, polysulfone resin, polyethersulfone resin, polycarbonate resin and polyether ether ketone resin.

12. The resin-coated metal foil of claim 10, wherein the organic filler is a fluorine-based organic filler containing a fluorine element.

13. The resin-coated metal foil of claim 10, wherein in the organic-inorganic composite filler, a content of the inorganic particles surface-treated with a silane coupling agent containing a functional group having a double bond is 0.001 to 10 parts by weight, based on 100 parts by weight of the organic filler.

14. The resin-coated metal foil of claim 10, wherein the functional group containing a double bond is a vinyl group or a (meth)acrylate group.

15. The resin-coated metal foil of claim 10, wherein the resin composition further comprises one or more selected from the group consisting of a curing agent, a flame retardant, a UV shielding agent, a leveling agent, a thickener, a pigment, a dispersant, and an antioxidant.

* * * * *